UNITED STATES PATENT OFFICE.

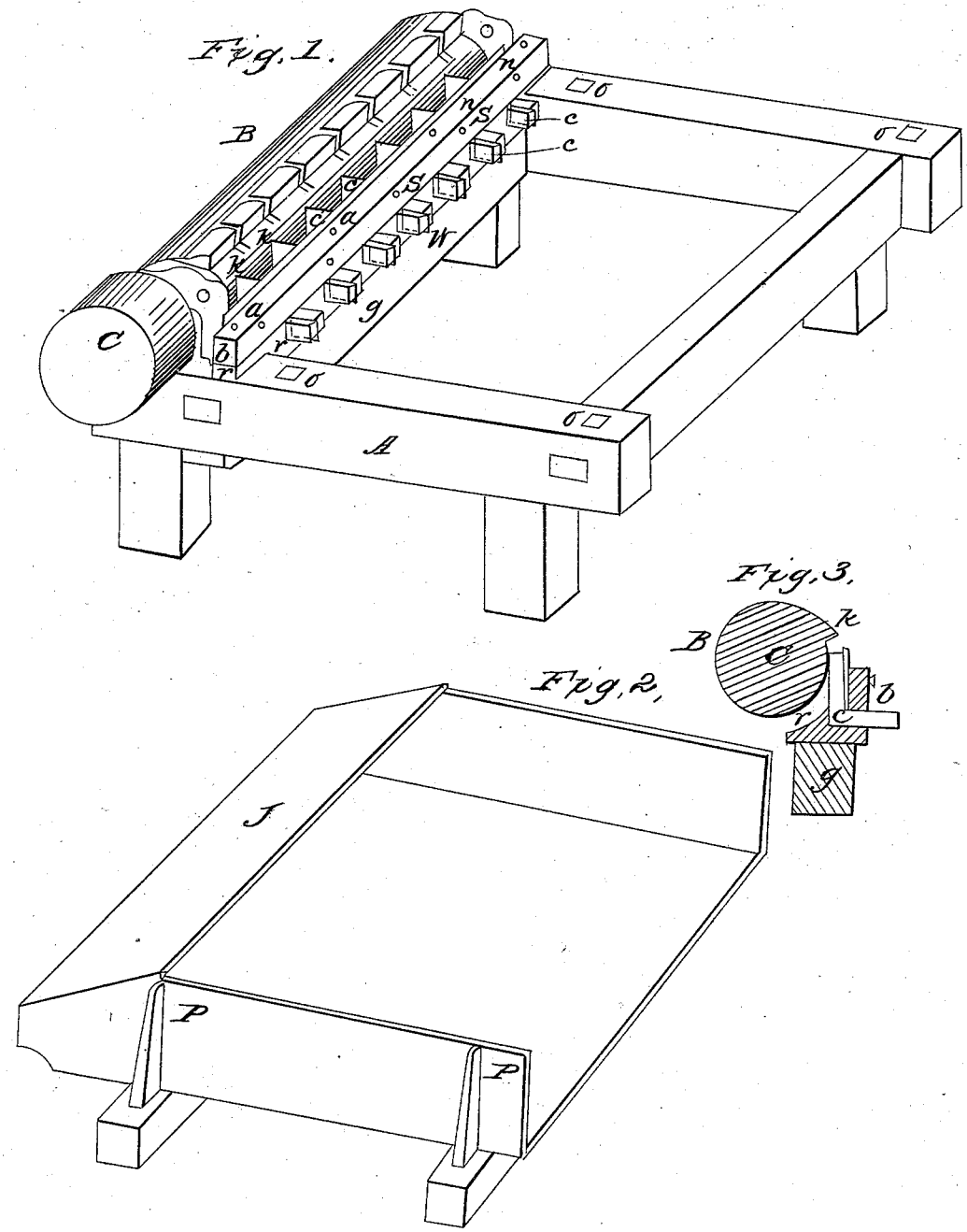

WM. HINDS, OF LITTLE FALLS, NEW YORK, ASSIGNOR TO JEROME HINDS, OF SAME PLACE.

STRAW-CUTTER.

Specification of Letters Patent No. 23,062, dated February 22, 1859.

*To all whom it may concern:*

Be it known that I, WM. HINDS, of Little Falls, county of Herkimer, and State of New York, have invented a new and useful Straw-Cutter; and I hereby declare the following to be a full, clear, and exact description of the construction and operation of the same, reference being had to the accompanying drawings, making a part of this specification, and to the letters of reference marked thereon.

The nature, and novelty, of my straw cutter, that constitutes its improvements, and distinguishes it from all other straw cutters, consists of the employment of a series of stationary cutters, arranged with their cutting edges on a level with the center, and at right angles to, a revolving cylinder, having upon it a series of knuckles that pass on either side of the cutters, and cuts the straw by carrying and forcing it across the cutting edges thereof.

To enable those skilled in the art to make my straw cutter, I will now describe its construction and operation.

Figure 1 of the drawings is a perspective view of the machine with hopper or feeding-box detached. Fig. 2 is the hopper, and Fig. 3 is a vertical cross section of the cylinder, rack or bed plate, and fastening bar, to show the form of the knuckles and cutters, &c.

The same letters indicate the same parts throughout.

A, Fig. 1, is the wood frame work on which the machinery is erected.

B, is the cylinder which is operated by a belt upon the pulley $c$, driven by horse or other power.

$k$, $k$, are a series of knuckles or carriers upon the cylinder, arranged in a right and parallel line longitudinally therewith. Between them is a narrow space or slot just sufficient in width to pass the cutters; and they are of the right length, and project far enough beyond the periphery of the cylinder, to determine the desired length of cut, to the straw or other material.

$r$, is a rack, or bed plate, resting upon the cross timber, or girt $g$, in the frame work, and is slotted, or grooved across, on top to form jambs and grooves in which, and between which, the cutters $c$, $c$, are secured by the keys, or wedges $w$, $w$.

$b$, is a bar bolted immediately over the prongs of the cutters to compress them firmly to the bed plate $r$, by the bolts $a$, $a$, that pass through the bed plate and fasten to the under side of the girt $g$.

Between the bar $b$, and the cutters $c$, $c$, is a long cutter of full length of the cylinder marked $n$, which is held firmly in contact with the cutters $c$, $c$, by the screws $s$, $s$, which operate through the bar $b$. The use of this cutter is very important for cutting straw or any material that shall go endwise to or not exactly parallel to the cylinder.

$c$, $c$, are cutters constructed in a right angular or L form with cutting edges on either prong so that when one prong shall become too short from wear, or otherwise, the other may be substituted in its place, to perform a like service, making this kind of cutter perform double work. It will readily be perceived that this form of cutter, and the method of confining it, by the rack $r$, bar $b$, and the keys $w$, $w$, is absolutely indispensable for holding said cutters in a firm position to operate conjointly with the long cutter $n$. The cutters are to be kept in proper adjustment to the cylinder against their becoming too short from wear, by putting fillets of wood or other material between the bed plate $r$, and girt $g$.

Fig. 2, is the hopper or box through which the material to be cut is fed to the machine.

The studs $p$, $p$, of the hopper (Fig. 2) extend far enough through the cross timbers into which they are framed to make tenons to serve in the mortises $o$, $o$, in the frame work A, to secure the hopper thereto.

J, is a board, or cover, erected in an inclined position upon the top of the hopper (Fig. 2) between which and the bottom thereof, the material to be cut, can be slightly compressed to give the knuckles and cutters a better action upon it.

The method of using this machine is simply to pitch the material into the hopper, and then force it against the cylinder with a rake.

The machine is not designed to be operated by the hand of man; but notwithstanding, it may be so operated, by attaching a crank to the pulley C, and when so operated (and perhaps in some other ways of using it) may need a balance wheel upon the shaft of the cylinder.

The important advantages possessed by this machine are: that it will cut tangled straw, hay, roots or vegetables, &c., with great rapidity; and that it is strong, and durable, little liable to get out of repair, and very simple to repair and keep in working order.

I am not aware that any machine for this, or any similar purpose, has been made or used that bears any very near resemblance to this. Peter S. Clinger, and Cyrus Cremer obtained a patent April 27th, 1858, for a "corn and other stalk cutter" which has stationary cutters connected in a concave; but with their cutting edges upon the sides thereof instead of the ends. I have seen meat cutters with knives in the cylinder to operate between teeth or spikes in a hollow cylinder. And I have also seen stationary cutters connected with the bottom cylinders of meat cutters by inserting their cutting edges through slots for the purpose and fastening them upon the outside. But in none of these is there any way to combine a long cutter therewith longitudinally with the cylinder to operate conjointly with said cutters.

With these qualifications, therefore, what I claim as my invention and wish to secure by Letters Patent is—

The arrangement of the cutters $c, c$, in combination with the cutter $n$, Fig. 1, constructed substantially as and for the purpose set forth.

WM. HINDS.

Witnesses:
MASON PIGGOTT,
JOHN S. HOLLINGSHEAD.